Jan. 23, 1962 — M. RYDINGER — 3,018,096
DEVICE FOR THE EXHAUSTION OF FLUE-GASES FROM ARC FURNACES
Filed Dec. 3, 1959
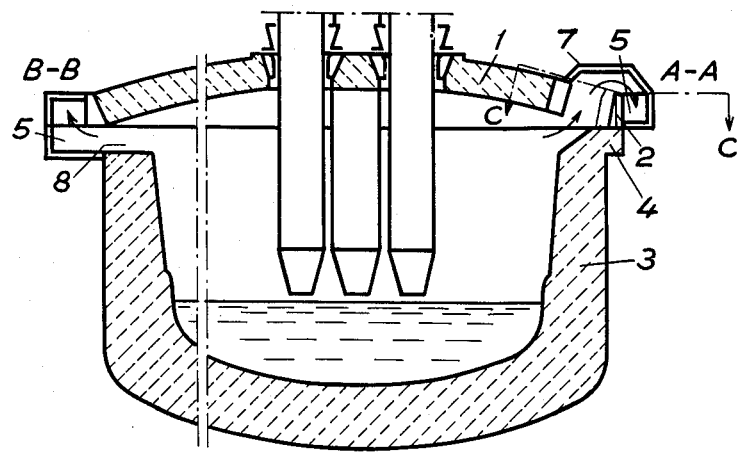
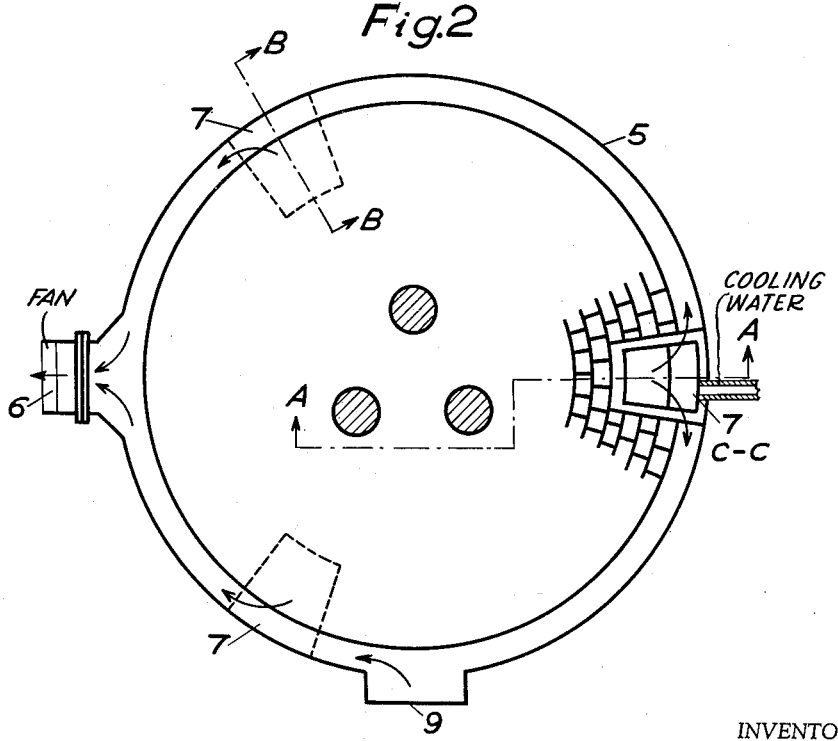
INVENTOR.
MATS RYDINGER United States Patent Office 3,018,096
Patented Jan. 23, 1962

3,018,096
DEVICE FOR THE EXHAUSTION OF FLUE-GASES FROM ARC FURNACES
Mats Rydinger, Vasteras, Sweden, assignor to Allmanna Svenska Elektriska Aktiebolaget, Vasteras, Sweden, a Swedish corporation
Filed Dec. 3, 1959, Ser. No. 857,155
Claims priority, application Sweden Dec. 8, 1958
4 Claims. (Cl. 263—10)

For the exhaustion of flue-gases from arc furnaces a means has preferably been used comprising a cylindrical case placed on the roof of the furnace about the electrodes and connected to an exhaust case provided with a fan. The flue-gases are exhausted through spaces between the electrodes and their leading through means in the roof. This construction has the following drawbacks:

Due to the necessarily comparatively great height of the exhaust case the structural height of the furnace is increased so that increased lifting height is required for exchange of electrodes, for instance, involving greater height of the lifting means and in some cases greater height of the building.

The increased height of the construction necessitates also greater length of the scarfed electrodes so that there is a greater risk of rupturing the electrodes and of increased electrode consumption, since larger surfaces thereof are exposed to the heat of the furnace.

The risk of increased electrode consumption occurs also due to the increased speed of the gases in the spaces between the electrodes and their leading through means in the roof, since the flue-gases usually have an oxidizing property during a part of the melting process.

Furthermore, it is likely that the exhaust case when not cooled will be deformed by thermal stresses and therefore become leaky. A still further drawback is that particles from the flue-gases may settle on the roof inside the case and shorten the life of the roof due to their insulating effect.

The present invention is based on a roof construction in which the roof itself is provided on its periphery with a hollow, water-cooled roof ring and it is characterised in that the outer wall of the roof ring constitutes one wall of a collecting duct for the flue-gases, which duct is connected to an exhaust system and that the collecting duct is joined with the furnace space by boxes which lead the flue gases from said space to the duct.

The accompanying drawing shows by way of example embodiments according to the invention, FIGURE 1 is a vertical section through an arc furnace. On the right hand side of the figure, one alternative of the new means is shown by a section along the line A—A in FIGURE 2, and on the left hand side thereof another alternative is illustrated by a section taken along the line B—B in FIGURE 2. This figure is an elevation view of the furnace roof including a partial section taken along the line C—C in FIGURE 1.

As usual the roof 1 of the furnace is constructed so that a metal ring 2 which holds together the masonry of the roof forms an abutment for the roof bricks and is used for cooling purposes since it is hollow, as shown on the drawing. The roof ring rests on the lining 3 of the furnace. According to the invention the inner diameter of the roof ring is increased beyond its conventional size, and the lining of the furnace body is provided, in the example shown, with an outwardly extended flange 4 supporting the hollow water-cooled ring.

The outer wall of the roof ring 2 forms the inner wall of a duct 5 which is extended around the periphery of the furnace and which is connected to a fan 6. In some places, e.g. in three places on the periphery, boxes 7 are arranged in recesses in the furnace roof, by means of which boxes the flue gases are led from the furnace space to the duct 5. These boxes are preferably water-cooled as indicated in FIGURES 1 and 2. They are suitably made integral with the roof ring and their inner walls are shaped as an abutment for the roof bricks. The dimensions are chosen so that they fit to the dimensions of the roof bricks and the bricks adjacent to the boxes.

The alternative according to the left-hand side of FIGURE 1 shows a duct 5 similar to that of the first alternative, but instead of the recesses in the furnace roof, recesses 8 are made in the lining 3 of the furnace body. Indicated by 9 is a cover over a furnace opening.

By the new construction not only the above mentioned drawbacks are eliminated but also improved cooling of the flue gases and simplified cleaning of the flue channels are attained. Furthermore the duct system is reduced which facilitates the operation of the furnace.

I claim:

1. In an arc furnace having a furnace roof, means for exhausting flue gases from the furnace comprising a hollow water-cooled roof ring provided on the periphery of the roof, a circular collecting duct for the flue gases arranged about the roof ring, the roof ring having an outer wall which constitutes the inner wall of said duct, an exterior exhaust system connected to said duct, and boxes arranged in the periphery of said duct and communicating with the interior of the furnace and with said duct for leading the flue gases from the interior of the furnace through said duct to the exhaust system.

2. In an arc furnace having a furnace roof, means for exhausting flue gases from the furnace comprising a hollow water-cooled roof ring provided on the periphery of the roof, a circular collecting duct for the flue gases arranged about the roof ring, the roof ring having an outer wall which constitutes the inner wall of said duct, an exterior exhaust system connected to said duct, and boxes arranged in the periphery of said duct and communicating with the interior of the furnace and with said duct for leading the flue gases from the interior of the furnace through said collecting duct to the exhaust system, said roof having recesses therein, the duct comprising a circular channel of sheet metal placed about the roof ring and the boxes being made of sheet metal and being located in said recesses in the furnace roof.

3. In an arc furnace having a furnace roof, means for exhausting flue gases from the furnace comprising a hollow water-cooled roof ring provided on the periphery of the roof, a circular collecting duct for the flue gases arranged about the roof ring, the roof ring having an outer wall which constitutes the inner wall of said duct, an exterior exhaust system connected to said duct, and boxes arranged in the periphery of said duct communicating with the interior of the furnace and with said duct for leading the flue gases from the interior of the furnace through said collecting duct to the exhaust system, said furnace having a lining with recesses therein, the duct comprising a circular channel of sheet metal placed about the roof ring and the boxes being made of sheet metal and being located in said recesses in the lining of the furnace.

4. In an arc furnace according to claim 1, said boxes having walls, and means for water-cooling the walls of the boxes.

References Cited in the file of this patent
UNITED STATES PATENTS

| 686,551 | Simon | Nov. 12, 1901 |
| 2,761,003 | Richardson | Aug. 28, 1956 |
| 2,868,860 | Foyn et al. | Jan. 13, 1959 |
| 2,929,858 | Koleda et al. | Mar. 22, 1960 |